US011838325B2

(12) United States Patent
Janakiraman et al.

(10) Patent No.: US 11,838,325 B2
(45) Date of Patent: *Dec. 5, 2023

(54) ELASTIC POLICY SCALING IN MULTI-CLOUD FABRICS

(71) Applicant: Cisco Technology, Inc., San Jose, CA (US)

(72) Inventors: Rajagopalan Janakiraman, Cupertino, CA (US); Sivakumar Ganapathy, Fremont, CA (US); Prashanth Matety, Fremont, CA (US); Patel Amitkumar Valjibhai, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 17/506,553

(22) Filed: Oct. 20, 2021

(65) Prior Publication Data
US 2022/0046061 A1 Feb. 10, 2022

Related U.S. Application Data

(63) Continuation of application No. 16/105,822, filed on Aug. 20, 2018, now Pat. No. 11,159,569.

(51) Int. Cl.
*H04L 9/40* (2022.01)
*H04L 12/46* (2006.01)
(Continued)

(52) U.S. Cl.
CPC .............. *H04L 63/20* (2013.01); *H04L 12/46* (2013.01); *H04L 12/4641* (2013.01);
(Continued)

(58) Field of Classification Search
CPC ..... H04L 63/20; H04L 12/4641; H04L 12/66; H04L 63/0263; H04L 41/0893; H04L 63/101
See application file for complete search history.

(56) References Cited

U.S. PATENT DOCUMENTS 8,705,513 B2 * 4/2014 Van Der Merwe ... G06F 9/5077
370/392
3,813,225 A1 8/2014 Fuller et al.
(Continued)

FOREIGN PATENT DOCUMENTS

EP 3188420 A1 7/2017

OTHER PUBLICATIONS

International Search Report and Written Opinion from the International Searching Authority, dated Dec. 6, 2019, 12 pages, for corresponding International Patent Application No. PCT/US2019/046775.

*Primary Examiner* — Jason Chiang
(74) *Attorney, Agent, or Firm* — Polsinelli

(57) ABSTRACT

Systems, methods, and computer-readable media for elastic policy scaling in multi-cloud fabrics. A method can involve deploying a cluster of policy agents on a hub virtual private cloud (VPC) that interconnects spoke VPCs in a cloud associated with a multi-cloud fabric, and mapping endpoints in the spoke VPCs to the policy agents. The method can involve distributing groups of policies for the endpoints across the policy agents based on the mapping of endpoints to policy agents, and advertising, by each policy agent to a respective first set of virtual gateways in the spoke VPCs, routes associated with endpoints mapped to the policy agent and preventing the policy agent from advertising routes associated with a second set of virtual gateways in the spoke VPCs. The method can involve applying, via the policy agent, a group of policies on the policy agent to traffic received by the policy agent.

20 Claims, 9 Drawing Sheets

(51) Int. Cl.
*H04L 12/66* (2006.01)
*H04L 41/0893* (2022.01)
*H04L 67/10* (2022.01)

(52) U.S. Cl.
CPC .......... *H04L 12/66* (2013.01); *H04L 41/0893* (2013.01); *H04L 63/0263* (2013.01); *H04L 63/101* (2013.01); *H04L 67/10* (2013.01); *H04L 63/0272* (2013.01)

(56) References Cited

U.S. PATENT DOCUMENTS

| | | | | |
|---|---|---|---|---|
| 8,813,225 B1* | 8/2014 | Fuller | | H04L 67/51 |
| | | | | 726/25 |
| 9,674,108 B1* | 6/2017 | Ryan | | H04L 47/70 |
| 9,813,379 B1* | 11/2017 | Shevade | | H04L 45/24 |
| 10,080,117 B1* | 9/2018 | Cerri | | H04W 4/50 |
| 10,313,225 B1* | 6/2019 | Shevade | | H04L 41/0806 |
| 10,439,877 B2* | 10/2019 | Kachalia | | H04L 41/0894 |
| 10,511,540 B1* | 12/2019 | Norbeck, Jr. | | H04L 47/823 |
| 10,523,631 B1* | 12/2019 | Wagner | | H04L 12/4633 |
| 10,609,081 B1* | 3/2020 | Appala | | H04L 61/5007 |
| 10,819,630 B1* | 10/2020 | Panchal | | H04L 12/4625 |
| 2006/0206606 A1* | 9/2006 | Iloglu | | H04L 41/0893 |
| | | | | 709/224 |
| 2008/0148342 A1* | 6/2008 | Aiyagari | | H04L 12/462 |
| | | | | 726/1 |
| 2012/0054367 A1* | 3/2012 | Ramakrishnan | | G06F 9/4856 |
| | | | | 718/1 |
| 2013/0151685 A1* | 6/2013 | Bursell | | H04L 49/70 |
| | | | | 709/223 |
| 2014/0181290 A1* | 6/2014 | Wong | | H04L 63/20 |
| | | | | 709/224 |
| 2014/0188972 A1* | 7/2014 | Bryan | | H04L 67/56 |
| | | | | 709/201 |
| 2014/0282824 A1* | 9/2014 | Lango | | G06F 16/00 |
| | | | | 726/1 |
| 2015/0124606 A1* | 5/2015 | Alvarez | | H04W 28/085 |
| | | | | 370/235 |
| 2016/0105392 A1* | 4/2016 | Thakkar | | H04L 61/5061 |
| | | | | 709/220 |
| 2016/0124742 A1* | 5/2016 | Rangasamy | | G06F 8/70 |
| | | | | 717/103 |
| 2016/0205037 A1* | 7/2016 | Gupte | | H04L 47/808 |
| | | | | 709/226 |
| 2016/0211988 A1* | 7/2016 | Lucas | | H04L 45/22 |
| 2016/0261638 A1* | 9/2016 | Xu | | H04L 63/20 |
| 2016/0308762 A1* | 10/2016 | Teng | | H04L 41/5096 |
| 2016/0337175 A1* | 11/2016 | Rao | | H04L 41/0806 |
| 2016/0373405 A1* | 12/2016 | Miller | | H04L 63/0236 |
| 2017/0012870 A1* | 1/2017 | Blair | | H04L 45/04 |
| 2017/0093702 A1 | 3/2017 | Teng et al. | | |
| 2017/0099182 A1* | 4/2017 | DeBolle | | H04L 63/20 |
| 2017/0104755 A1* | 4/2017 | Arregoces | | H04L 67/10 |
| 2018/0026895 A1* | 1/2018 | Wang | | H04L 41/0895 |
| | | | | 370/235 |
| 2018/0062917 A1 | 3/2018 | Chandrashekhar et al. | | |
| 2018/0063086 A1 | 3/2018 | Hira et al. | | |
| 2018/0063176 A1* | 3/2018 | Katrekar | | H04L 43/10 |
| 2018/0063193 A1* | 3/2018 | Chandrashekhar | | G06F 15/177 |
| 2018/0167783 A1* | 6/2018 | Khoche | | C09J 7/38 |
| 2018/0359323 A1* | 12/2018 | Madden | | H04L 69/28 |
| 2019/0089620 A1* | 3/2019 | Hefel | | H04L 45/02 |
| 2019/0109729 A1* | 4/2019 | De Luca | | H04L 45/17 |
| 2019/0123973 A1* | 4/2019 | Jeuk | | G06F 9/5027 |
| 2019/0238509 A1* | 8/2019 | Hira | | G06F 9/45558 |
| 2019/0245830 A1* | 8/2019 | Ratnasingham | | H04L 63/0272 |
| 2020/0028758 A1* | 1/2020 | Tollet | | H04L 67/10 |

* cited by examiner

ELASTIC POLICY SCALING IN MULTI-CLOUD FABRICS

CROSS-REFERENCE TO RELATED APPLICATION

The instant Application is a Continuation of U.S. patent application Ser. No. 16/105,822 entitled ELASTIC POLICY SCALING IN MULTI-CLOUD FABRICS filed Aug. 20, 2018, the contents of which are expressly incorporated herein by reference it its entirety.

TECHNICAL FIELD

The present technology pertains to cloud computing, and more specifically to multi-cloud policy scaling and integration.

BACKGROUND

The ubiquity of Internet-enabled devices has created an enormous demand for Internet services and content. We have become a connected society where users are increasingly reliant on network services and content. This Internet-connected revolution has created significant challenges for service and content providers who often struggle to service a high volume of user requests without falling short of user performance expectations. For example, cloud providers typically need large and complex datacenters to keep up with network and content demands from users. These datacenters are generally equipped with server farms configured to host specific services, and include numerous switches and routers programmed to route datacenter traffic and enforce a large amount of security policies. In many instances, a specific datacenter is expected to handle millions of traffic flows and enforce numerous security requirements.

Private networks owned by private entities, such as enterprises, similarly have increasing demands for computing resources and performance. To satisfy such increasing demands, private entities often purchase compute resources and services from public cloud providers. For example, private entities can create a virtual private cloud on a public cloud and connect the virtual private cloud to their private network in order to grow their available compute resources and capabilities. In this way, private entities can interconnect their on-premises datacenter with a remote datacenter hosted on a public cloud, and thereby extend their private network. Unfortunately, the lack of uniformity in the policy models and configuration restrictions between datacenter and cloud provider solutions significantly limit a private entity's ability to integrate disparate environments and apply a consistent policy model across datacenter environments. For example, Cisco's software-defined network and datacenter management solution, the Application-Centric Infrastructure (ACI), supports hundreds of thousands security policies, including 128K contract rules, 64K IP addresses, and 4K endpoint groups (EPGs) per leaf switch. By contrast, Amazon's public cloud solution, Amazon Web Services (AWS), has a restriction of 250 security rules per endpoint, which is orders of magnitude smaller than the scale of policies supported by the ACI. Consequently, the disparate policy models and configuration restrictions between cloud and datacenter solutions can significantly limit the scalability and uniformity of policies in hybrid cloud implementations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
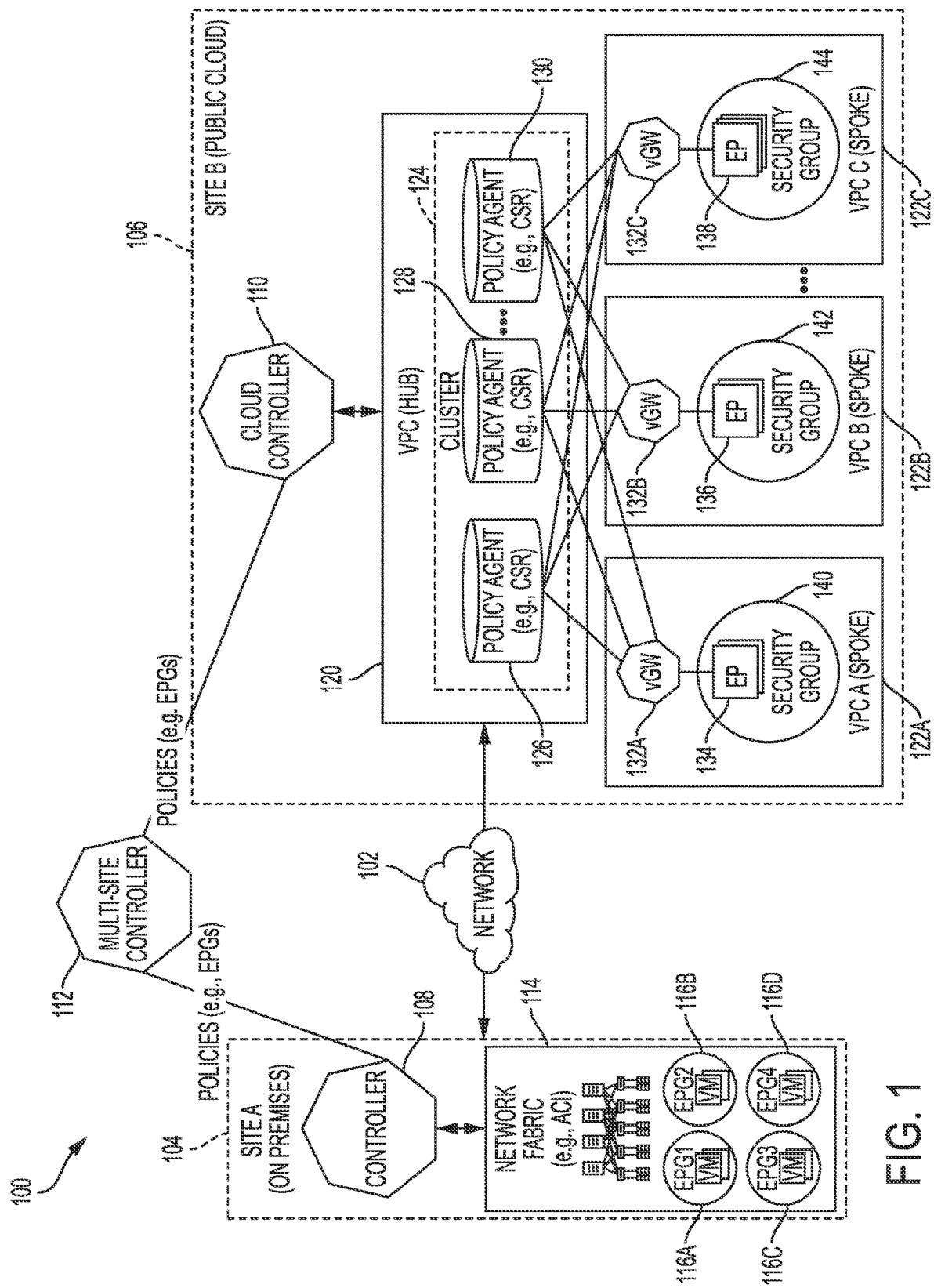
FIG. 1 illustrates an example architecture for policy scaling and integration in a multi-cloud fabric including an on-premises site and a public cloud.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for elastic policy scaling and integration in multi-cloud fabrics. In some examples, a method can involve deploying a cluster of routers or "policy agents" on a hub virtual private cloud that interconnects a plurality of spoke virtual private clouds. The hub virtual private cloud and the plurality of spoke virtual private clouds can be hosted on a cloud associated with a multi-cloud fabric. The cloud can be, for example, a public cloud. The multi-cloud fabric can extend to additional clouds, such as a private cloud for example.

The method can further involve mapping endpoints in the plurality of spoke virtual private clouds to the policy agents in the cluster based on one or more common attributes. The one or more common attributes can include common virtual private clouds associated with the endpoints, common subnets associated with the endpoints, common endpoint groups (EPGs) associated with the endpoints, common virtual routing and forwarding (VRF) instances associated with the endpoints, etc. Moreover, the method can involve distributing security policies associated with the endpoints across the policy agents based on the mapping of endpoints to the policy agents. The security policies can include groups of security policies defined for traffic associated with respective subsets of the endpoints, and each group of security policies can be deployed on a policy agent that is mapped to a respective subset of the endpoints associated with the group of security policies.

The method can involve advertising, by each respective policy agent in the cluster, to a respective first set of virtual gateways in the plurality of spoke private virtual clouds, routes associated with the respective subset of the endpoints mapped to the respective policy agent and, based on border gateway protocol (BGP) route maps, preventing each respective policy agent in the cluster from advertising routes associated with a respective second set of virtual gateways in the plurality of spoke private virtual clouds. The method can further involve in response to the respective policy agent receiving traffic associated with one or more of the endpoints, applying, via the respective policy agent, one or more of the group of security policies deployed on the policy agent.

In some cases, the method can involve defining respective security group tags (SGTs) associated with the groups of security policies, and associating the endpoints with the respective SGTs based on respective endpoint attributes. The respective endpoint attributes can include, for example, a respective type of traffic associated with the endpoints, predetermined security requirements associated with the endpoints, etc. Moreover, in some examples, associating the endpoints with the respective SGTs can include mapping respective IP addresses of the endpoints to the respective SGTs to yield IP-to-SGT mappings. IP addresses can be used to identify endpoints for traffic across the multi-cloud fabric. Accordingly, the IP-to-SGT mappings can be used to apply security policies to traffic associated with the IP addresses of the endpoints. For example, each SGT can be associated with a set of security policies defined for endpoints mapped to the SGT. When a router or policy agent then receives traffic associated with an IP mapped to an SGT, the router or policy agent can apply to that traffic any security policies associated with that SGT.

In some implementations, the respective SGTs can correspond to respective endpoint EPGs on a private cloud associated with the multi-cloud fabric, and the groups of security policies can correspond to EPG policies on the private cloud. The respective policy agent can apply security policies based on the destination endpoint of the traffic. In some cases, the respective policy agent can apply security policies via its egress interface(s) prior to forwarding traffic to the destination endpoint(s). The respective policy agent can also store, process and/or apply a higher number of security policies for any endpoint than a maximum number of security policies permitted by the cloud for each endpoint in the cloud.

In some implementations, the method can also involve identifying, for each endpoint in the plurality of spoke virtual private clouds, a respective set of permit rules for traffic originating from source endpoints residing on a different respective spoke virtual private cloud than the endpoint, and aggregating two or more of the respective set of permit rules based on a common prefix associated with two or more IP addresses corresponding to the source endpoints to yield one or more prefix-based rules associated with the endpoint. The common prefix can include a prefix calculated for the two or more IP addresses that falls outside of an address range corresponding to a respective spoke virtual private cloud where the endpoint resides. Once the one or more prefix-based rules have been calculated for the two or more IP addresses, the endpoint can be configured to apply the one or more prefix-based rules to traffic matching the common prefix.

In some examples, a system is provided for elastic policy scaling and integration in multi-cloud fabrics. The system can include one or more processors and at least one computer-readable storage medium storing instructions which, when executed by the one or more processors, cause the system to perform operations for elastic policy scaling and integration in multi-cloud fabrics. For example, the operations can involve deploying a cluster of policy agents on a virtual private cloud that interconnects a plurality of virtual private clouds, the virtual private cloud and the plurality of virtual private clouds residing in a cloud associated with a multi-cloud fabric. The operations can also involve mapping endpoints in the plurality of virtual private clouds to the policy agents in the cluster based on one or more common attributes, and distribute security policies for traffic associated with the endpoints across the policy agents based on the mapping of endpoints to the policy agents. The security policies can include groups of security policies defined for traffic associated with respective subsets of the endpoints, and each group of security policies can be deployed on a respective policy agent that is mapped to a respective subset of the endpoints.

The operations can further involve advertising, by each respective policy agent in the cluster to a respective first set of virtual gateways in the plurality of private virtual clouds, one or more routes associated with the respective subset of the endpoints mapped to the respective policy agent, and based on border gateway protocol (BGP) route maps, preventing each respective policy agent in the cluster from advertising, to a plurality of virtual gateways in the plurality of private virtual clouds, routes associated with a respective second set of virtual gateways in the plurality of private virtual clouds. The operations can involve in response to the respective policy agent receiving traffic associated with one or more of the endpoints, applying via the respective policy agent, one or more of the group of security policies deployed on the respective policy agent.

In some examples, a non-transitory computer-readable storage medium is provided for elastic policy scaling and integration in multi-cloud fabrics. The non-transitory computer-readable storage medium can include instructions stored thereon which, when executed by one or more processors, cause the one or more processors to perform operations for elastic policy scaling and integration in multi-cloud fabrics. For example, the operations can involve deploying a cluster of policy agents on a virtual private cloud that interconnects a plurality of virtual private clouds, the virtual private cloud and the plurality of virtual private clouds residing in a cloud associated with a multi-cloud fabric; mapping endpoints in the plurality of virtual private clouds to the policy agents in the cluster based on one or more common attributes; and distributing security policies for traffic associated with the endpoints across the policy agents based on the mapping of endpoints to the policy agents. The security policies can include groups of security policies defined for traffic associated with respective subsets of the endpoints, and each group of security policies can be deployed on a respective policy agent that is mapped to a respective subset of the endpoints.

The operations can further involve advertising, by each respective policy agent in the cluster to a respective first set of virtual gateways in the plurality of private virtual clouds, one or more routes associated with the respective subset of the endpoints mapped to the respective policy agent, and based on border gateway protocol (BGP) route maps, preventing each respective policy agent in the cluster from advertising, to a plurality of virtual gateways in the plurality of private virtual clouds, routes associated with a respective second set of virtual gateways in the plurality of private virtual clouds. The operations can also involve in response to the respective policy agent receiving traffic associated with one or more of the endpoints, applying, via the respective policy agent, one or more of the group of security policies deployed on the respective policy agent.

DESCRIPTION OF EXAMPLE EMBODIMENTS

The disclosed technologies address the need in the art for elastic policy scaling and policy model integration in multi-cloud fabrics. The approaches set forth herein can integrate security policies across disparate cloud or datacenter environments and support elastic policy scaling across the disparate cloud or datacenter environments despite specific policy restrictions imposed by a particular cloud provider in the hybrid environment. For example, the approaches herein can extend a cloud or datacenter solution, such as Cisco's Application-Centric Infrastructure (ACI), across multiple datacenters or public clouds to enforce a consistent policy model across the multiple datacenters or public clouds. The number of security policies implemented across the multiple datacenters or public clouds can be scaled to exceed security policy restrictions or limits imposed by particular cloud providers. The approaches herein can thus provide increased policy uniformity, flexibility and granularity across the multiple datacenters or clouds.

Figure 8:
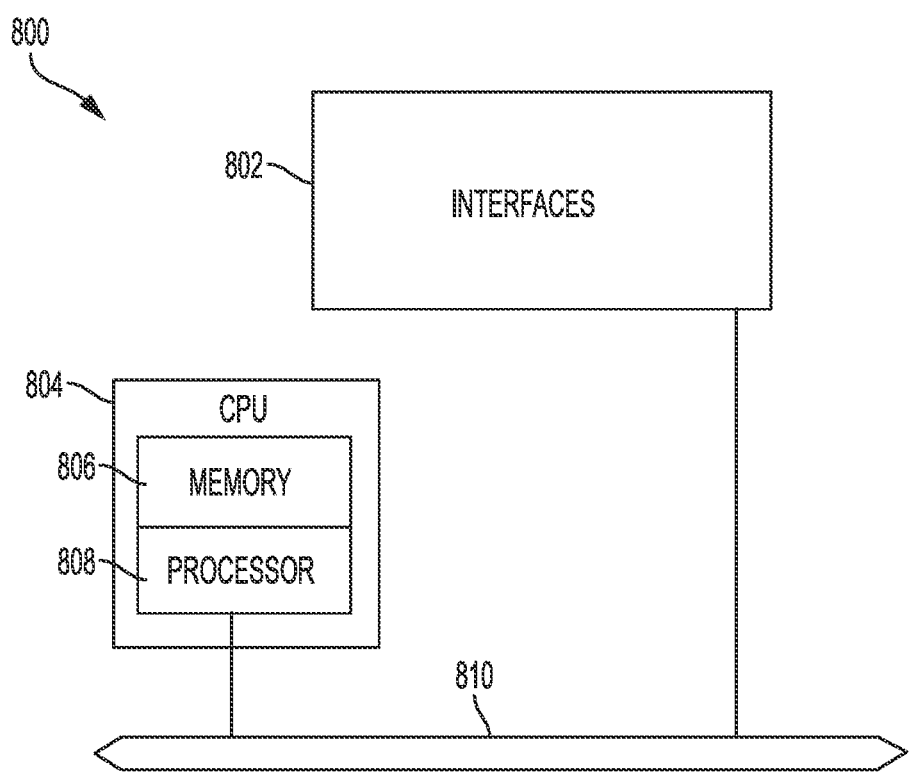
FIG. 8 illustrates an example network device in accordance with various embodiments.
Figure 9:
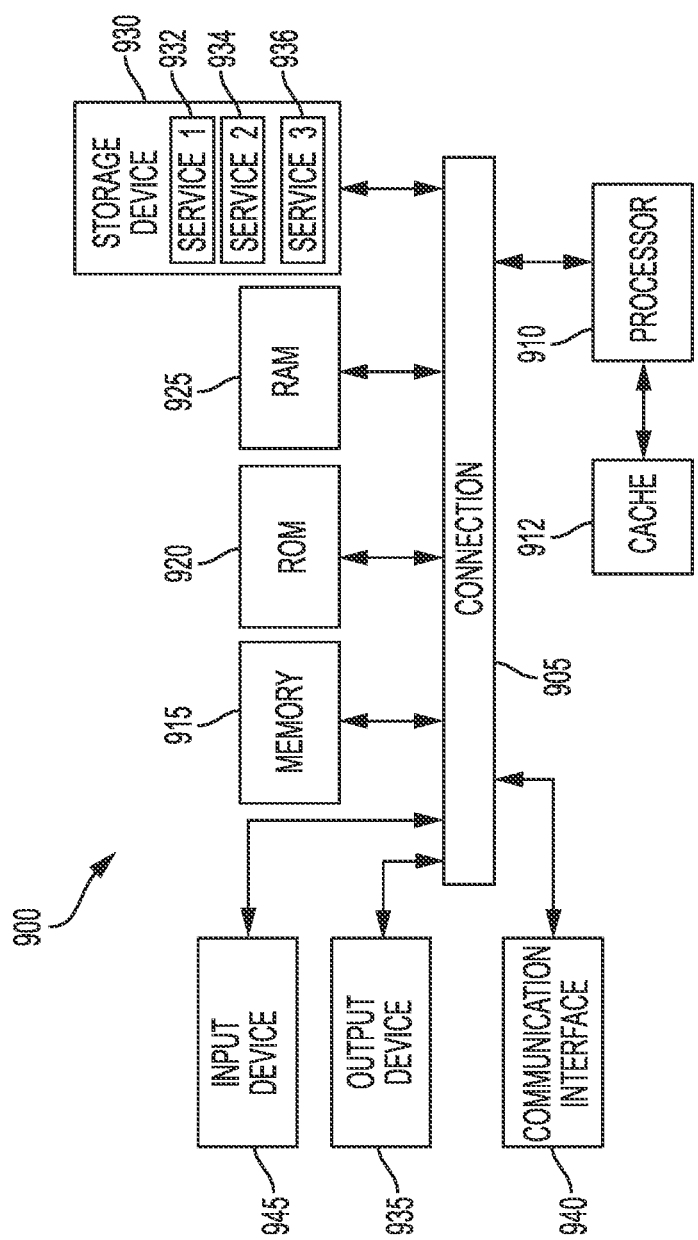
FIG. 9 illustrates an example computing device in accordance with various embodiments.

The present technologies will be described in the following disclosure as follows. The discussion begins with an overview of policy scaling and management in a multi-cloud fabric. The discussion continues with a description of an example architecture for policy scaling and integration in a multi-cloud fabric, as illustrated in FIG. 1. A description of example strategies and configurations for policy scaling and integration in a multi-cloud fabric, as illustrated in FIGS. 2-7, will then follow. The discussion concludes with a description of an example network device, as illustrated in FIG. 8, and an example computing device, as illustrated in FIG. 9, including example hardware components suitable for performing networking and computing operations. The disclosure now turns to an overview discussion of policy scaling and management in a multi-cloud fabric.

A multi-cloud fabric or datacenter solution, such as Cisco's Application-Centric Infrastructure (ACI), can manage network, security, and services for workloads in multiple network fabrics or datacenters, such as an on-premises datacenter and one or more cloud sites. The multi-cloud solution can group endpoints into groups or collections of endpoints called endpoint groups (EPGs), and apply security policies or contracts to corresponding EPGs. With the multi-cloud solution, an EPG can include endpoints in both the on-premises datacenter and the public cloud(s). Through the EPG, security policies or contracts can thus be enforced for traffic from endpoints on both the on-premises datacenter and the public cloud(s). The security policies and networking configurations can be managed by one or more controllers associated with the multi-cloud solution, such as an ACI Application Policy Infrastructure Controller or APIC.

As previously mentioned, networking configurations and policies in the public cloud can have various restrictions imposed by the cloud provider. Such restrictions can limit the number of security policies supported by the cloud provider much below the scale of policies supported by the datacenter solution implemented at the on-premises data center. For example, Cisco's ACI supports hundreds of thousands security policies, including 128K contract rules, 64K IP addresses, and 4K EPGs per leaf switch, while Amazon's AWS has a restriction of 250 security rules per endpoint. Accordingly, when Cisco's ACI solution is integrated with a public cloud solution, such as Amazon's AWS, the public cloud's restrictions can impose unnecessary restrictions on the ACI solution and create inconsistent policy models.

Security rules on the cloud can be applied to destination endpoints and Layer 4 (L4) ports. Destination endpoints can be referred by a group or an IP address. While grouping endpoints helps in scaling the security rules, such security rules cannot be applied to endpoints that are external to the cloud or cloud endpoints on a different Virtual Routing and Forwarding (VRF) instance or Virtual Private Cloud (VPC) which reside behind a service device such as a load balancer or firewall. Moreover, when a cloud host instance runs multiple applications, the security rule limit imposed by the cloud provider will quickly be reached. For example, assume there are 5 containers running on a cloud host and are port mapped. AWS' 250 rule limit will be reached with 25 external IPs talking to the host: 25 IPs×5 TCP (Transmission Control Protocol) ports×2 directions. While having prefix-based rules can help with this scale limitation, this restriction becomes severe when security group policies need to be applied to individual IP addresses (e.g., /32 IPs). Yet /32 IP addresses may be necessary in order to support micro-segmentation or compute label-based grouping, where IP subnet and policy are essentially decoupled.

In addition, for a hybrid-cloud interconnect, the public cloud does not provide an Layer 2 (L2) stretch. This in turn means that all security group policies need to be applied on Layer 3 (L3) constructs, which then become significantly limited by the cloud provider's resource scale limits as mentioned above. To illustrate, assume a cloud hosted "shared service" is used by 100s of ACI on-premise EPGs, and hence by 1000s of endpoints. This means that the ACI endpoint IP addresses inside the cloud must be enumerated in order to program the cloud security policies. However, given the cloud-imposed scale limitations, enumerating 1000s of IP addresses will not scale in the cloud. Moreover, for any policy change, the security group entries across all the 1000s of IP addresses must be re-enumerated, thereby causing additional scalability issues.

To overcome the scale limits imposed by the cloud, the approaches herein can implement policy engines to apply policies on the cloud, as opposed to relying on cloud-native constructs such as security groups. The policy engines can be software or VM-based policy agents on cloud services routers (CSRs), such as Cisco's CSR 1000v.

FIG. 1 illustrates an example architecture 100 for policy scaling and integration in a multi-cloud fabric. The architecture 100 can include a network fabric 114 on an on-premises site 104 (e.g., Site A), such as a private cloud or datacenter, and interconnected VPCs 120, 122A, 122B, 122C on a public cloud 106 (e.g., Site B).

The network fabric 114 can be configured according to an SDN or datacenter solutions, such as Cisco's ACI, which can be implemented and/or managed via one or more controllers, such as controller 108 (e.g., APIC). The controller 108 can manage security policies and interconnectivity for elements in the network fabric 114, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises site 104.

The controller 108 can configure EPGs 116A-D, which can be used to manage and implement policies and configurations for groups of endpoints. EPGs (e.g., 116A-D) are managed objects that contain endpoints (e.g., VMs, software containers, virtual appliances, servers, applications, service chains, workloads, etc.) that are connected to the network (e.g., network fabric 114) either directly or indirectly. The endpoints have certain attributes, such as an address, location, identity, functionality, etc., and can be physical and/or virtual. EPGs are thus logical grouping of such endpoints based on one or more common factors. Non-limiting example factors which can be used to group endpoints into a common EPG include common security requirements, whether the endpoints require VM mobility, common QoS (quality-of-service) settings, common L4-L7 (Layer-4 through Layer-7) services, etc. EPGs (e.g., 116A-D) can span multiple switches and can be associated with respective bridge domains (BDs). In some cases, endpoint membership in an EPG can be static or dynamic.

EPGs 116A-D can contain respective endpoint memberships and can represent different EPGs (e.g., logical groupings) that are based on different, respective factors as previously explained. For example, EPG 116A may represent a logical grouping of endpoints configured as web servers (e.g., WEB-EPG), EPG 116B may represent a logical grouping of endpoints configured as database servers (e.g., DB-EPG), EPG 116C may represent a logical grouping of endpoints configured as application A servers (e.g., APP.A-EPG), and EPG 116D may represent a logical grouping of endpoints configured as application B servers (e.g., APP.B-EPG). The controller 108 can configure specific policies (e.g., contracts, filters, requirements, etc.) for each of the EPGs 116A-D. Such policies or contracts can define, for example, what EPGs 116A-D can communicate with each other and what type of traffic can pass between EPGs 116A-D.

The architecture 100 can include a multi-site controller 112 (e.g., multi-site APIC) which communicates with controller 108 in the on-premises site 104 and a cloud controller 110 (e.g., cloud APIC) on the public cloud 106 and works with controller 108 and cloud controller 110 to manage and implement policies and configurations on both the on-premises site 104 and the public cloud 106. The multi-site controller 112 can implement a same policy model on both the on-premises site 104 and the public cloud 106, which can be based on a particular SDN or datacenter solution such as Cisco's ACI. For example, the multi-site controller 112 can implement EPGs and EPG policies on both the on-premises site 104 and the public cloud 106. Such policies can be coordinated by the multi-site controller 112 with the controller 108 in the on-premises site 104 and the cloud controller 110 in the public cloud 106.

The public cloud 106 can also implement a different policy model and may have its own set of requirements (e.g., policy requirements, scalability requirements, etc.) which may differ from those imposed by the solution implemented by the controllers 108, multi-site controller 112, and cloud controller 110. The policy model and requirements on the public cloud 106 can depend on the cloud provider. For example, AWS may implement security groups and impose a 250-rule limit. As further described below, the approaches herein can integrate and scale the policy model and requirements imposed by the public cloud 106 with those associated with the controllers 108, multi-site controller 112, and cloud controller 110 in order to apply a consistent policy model and increase the scalability of the overall solution implemented on the architecture 100, including the public cloud 106.

The public cloud 106 includes VPCs 120, 122A, 122B, and 122C, which represent virtual private clouds or VPCs hosted on the public cloud 106 and interconnected with the on-premises site 104. The VPCs 120, 122A, 122B, and 122C can host applications and resources on the public cloud 106 for use by the on-premises site 104. In some cases, the VPCs 120, 122A, 122B, and 122C can represent virtual routing and forwarding (VRF) instances corresponding to the on-premises site 104.

The VPCs 120, 122A, 122B, and 122C on the public cloud 106 can be interconnected via VPC 120. In this example, VPCs 120, 122A, 122B, and 122C are configured in a hub-and-spoke topology, with VPC 120 serving as the hub and VPCs 122A-C serving as spokes. However, other interconnections and topologies are also possible and contemplated herein.

VPCs 122A-C can include respective virtual gateways 132A-C which interconnect the VPCs 122A-C with VPC 120 and route traffic in and out of the VPCs 122A-C. In some cases, the virtual gateways 132A-C can be, for example, VMs deployed on the public cloud 106 and, more specifically, on each of the VPCs 122A-C, which run respective network services such as WAN or network gateway services. VPCs 122A-C can also host respective endpoints 134, 136, 138 which connect to the respective virtual gateways 132A-C to communicate with devices and applications outside of the respective VPCs 122A-C, such as VPC 120 and on-premises site 104. Each of the VPCs 122A-C can host any number of endpoints, and multiple endpoints on a particular VPC can have similar or different attributes.

In this example, endpoint (EP) 134 on VPC 122A is associated with security group 140, EP 136 on VPC 122B is associated with security group 142, and EP 138 on VPC 122C is associated with security group 144. A security group is a construct of the public cloud 106 which allows specific security rules to be applied to specific traffic or cloud instances. A security group thus acts as a virtual firewall for associated cloud instance(s) to control inbound and outbound traffic for such cloud instance(s). In some cases, the security groups 134, 136, 138 can follow a whitelist model which supports allow or permit rules to be defined to allow traffic associated with those allow or permit rules.

The VPC 120 (e.g., hub VPC) can include a cluster 124 of policy agents 126, 128, 130. The policy agents 126, 128, 130 can be routers, such as cloud services routers or CSRs, configured to store and enforce policies and perform other functions as described herein. The policy agents 126, 128, 130 can connect (directly or indirectly) to virtual gateways 132A-C on VPCs 122A-C to route traffic between VPC 120 and VPCs 122A-C. Each of the policy agents 126, 128, 130 can have routes to each of the virtual gateways 132A-C and thus can communicate with each of the virtual gateways 132A-C. However, as further explained below, in some cases, each of the policy agents 126, 128, 130 may only advertise route maps to a subset of the virtual gateways 132A-C for increased scalability.

In some cases, the policy agents 126, 128, 130 can be virtual routers deployed on VMs in the public cloud 106. Moreover, the policy agents 126, 128, 130 can include policy engines or software which, as further explained below, allow the policy agents 126, 128, 130 to apply policies for traffic associated with the VPCs 120, 122A, 122B, 122C without necessarily relying on cloud-native objects or constructs such as security groups 140, 142, 144, and without being limited by the specific requirements or limitations imposed by the cloud provider associated with the public cloud 106. In some cases, the policy agents 126, 128, 130 can include software or VM-based policy engines configured to apply specific policies to specific traffic and/or addresses (e.g., IP addresses or prefixes). The policy agents 126, 128, 130 can thus double-up as routers and policy agents.

The policy agents 126, 128, 130 can apply policies to groups of IP addresses or prefixes. This can be done via security group tags (SGTs) based on IP-to-SGT mappings. An SGT can specify specific policies that should be applied to traffic associated with IPs mapped to the SGT. Traffic associated with an IP mapped to an SGT can be tagged with the SGT to indicate that the policies associated with that SGT should be applied to that traffic. The policy agents 126, 128, 130 can then match the traffic with the SGT and apply to the traffic any policies defined for the SGT. The SGT thus allows the policy agents 126, 128, 130 to apply access control list (ACL) rules to traffic associated with the IPs mapped to the SGT.

With IP address grouping, ACLs can be applied on SGTs without having to define security rules enumerating each of the IP addresses, thereby allowing the policies in the public cloud 106 to scale beyond the limitations imposed by the cloud provider associated with the public cloud 106, such as the 250-rule limitation in the case of Amazon's AWS. The SGTs and associated policies can mirror or comport with the policy model implemented by the controllers 108, 110, 112 to achieve a consistent policy model across the architecture 100, and can scale according to the more-expansive requirements associated with the controllers 108, 110, 112.

Policy agents 126, 128, 130 can be configured to be elastically scalable based on multiple factors. For example, policy agents 126, 128, 130 can be elastically scalable based on the policy scale and bandwidth requirements of individual cloud endpoints (e.g., EPs 134, 136, 138) or group of endpoints. As another example, policy agents 126, 128, 130 can be scaled by VRF, bandwidth availability on the policy agents, etc.

The policy agents 126, 128, 130 in the cluster 124 can apply policies across different endpoints (e.g., EPs 134, 136, 138). Policies can be spread across the cluster 124 such that a given EP (e.g., 134, 136, 138) may have its policy or policies in one, or a subset, of the policy agents 126, 128, 130 in the cluster 124. The mapping between an endpoint and a policy agent in the cluster 124 can be done via any of several mapping algorithms, such as VRF or VPC-based mapping, subnet-based mapping, EPG-based mapping, etc. In some cases, there may also be other constraints for selecting in which policy agent to install a given policy, such as scale and bandwidth requirements of the source endpoint; existing configuration of the policy agent; whether the destination is inside or outside of the VRF, VPC, or public cloud 106; etc.

Figure 2:
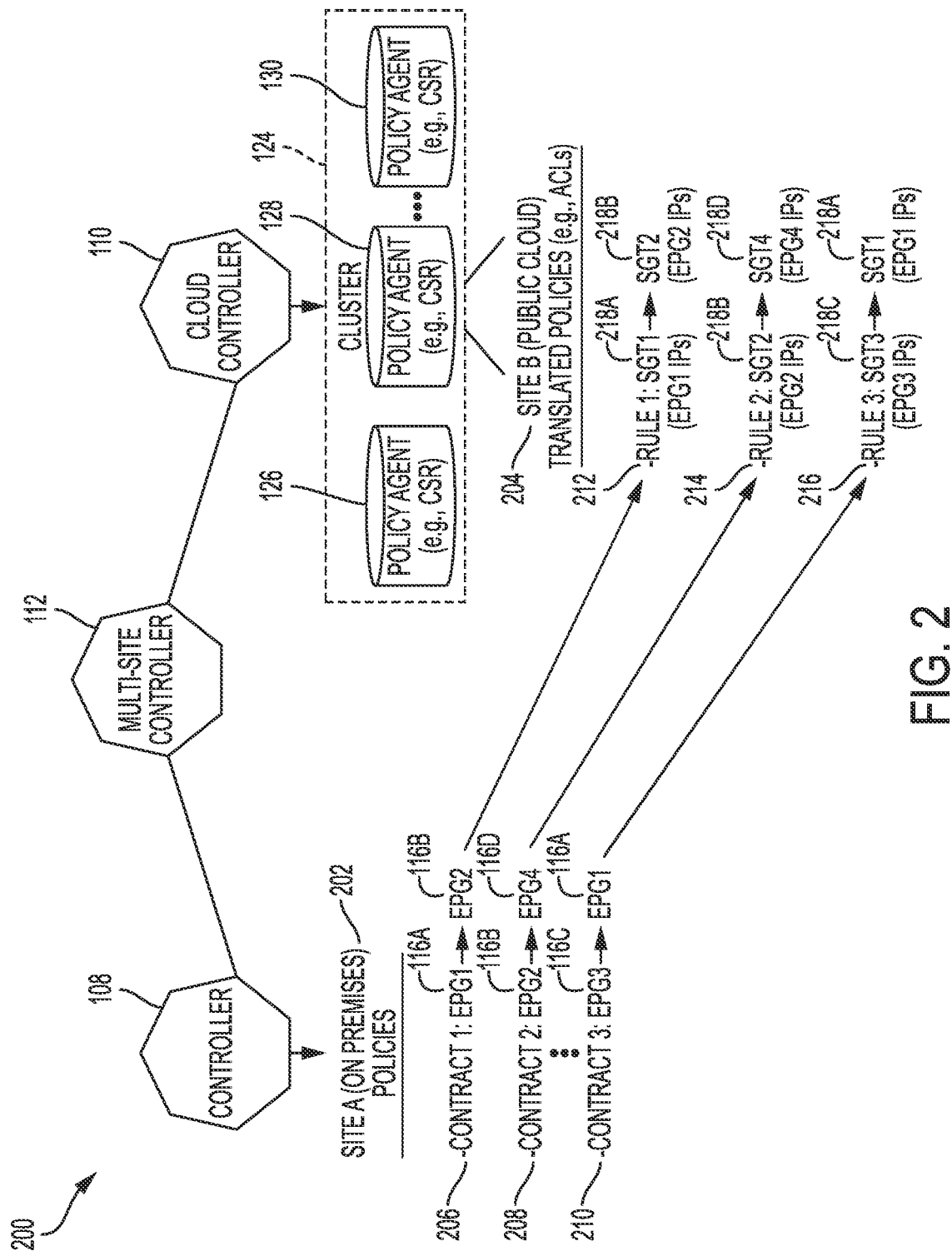
FIG. 2 illustrates example policy mappings which translate policies configured in an on-premises site to access control list (ACL) rules deployed on policy agents in a cluster of routers on a public cloud.

FIG. 2 illustrates example policy mappings 200 which translate policies 202 configured in the on-premises site 104 via controller 108, to ACLs 204 on the policy agents 126, 128, 130 in the cluster 124 in the public cloud 106. In this example, the policy mappings 200 translate policies defined for EPGs to rules for SGTs.

For example, the policies 202 configured in the on-premises site 104 include contracts 206, 208, 210 defining rules for traffic between EPGs 116A-C in the on-premises site 104. In particular, contract 206 defines a rule for traffic between EPG 116A and EPG 116B. Contract 208 defines a rule for traffic between EPG 116B and EPG 116D. Contract 210 defines a rule for traffic between EPG 116C and EPG 116A.

At the public cloud 106, the cluster 124 can include ACLs 204 including rules 212, 214, 216 corresponding to policies 206, 208, 210. In particular, rule 212 represents a rule for traffic between SGT 218A and SGT 218B. SGT 218A is mapped to the IPs of endpoints associated with EPG 116A and SGT 218B is mapped to the IPs of endpoints associated with EPG 116B. Thus, rule 212 associated with SGT 218A and SGT 218B is consistent with policy 206 associated with EPG 116A and EPG 116B.

Rule 214 represents a rule for traffic between SGT 218B and SGT 218D. SGT 218B is mapped to the IPs of endpoints associated with EPG 116B, as previously mentioned, and SGT 218D is mapped to the IPs of endpoints associated with EPG 116D. Thus, rule 214 associated with SGT 218B and SGT 218D is consistent with policy 208 associated with EPG 116B and EPG 116D.

Rule 216 represents a rule for traffic between SGT 218C and SGT 218A. SGT 218A is mapped to the IPs of endpoints associated with EPG 116A, as previously mentioned, and SGT 218C is mapped to the IPs of endpoints associated with EPG 116C. Thus, rule 216 associated with SGT 218BC and SGT 218A is consistent with policy 210 associated with EPG 116C and EPG 116A.

Based on the ACLs 204, including rules 212, 214, 216, the cluster 124 can scale the policies for the public cloud 106 and apply, via the policy agents 126, 128, 130, security rules matching the policies 202 in the on-premises site 104. As previously explained, the rules 212, 214, 216 can be distributed to specific policy agents (e.g., 126, 128, 130) in the cluster 124 based on one or more schemes, such as VRF or VPC-based distribution, bandwidth-based distribution, etc.

Figure 3:
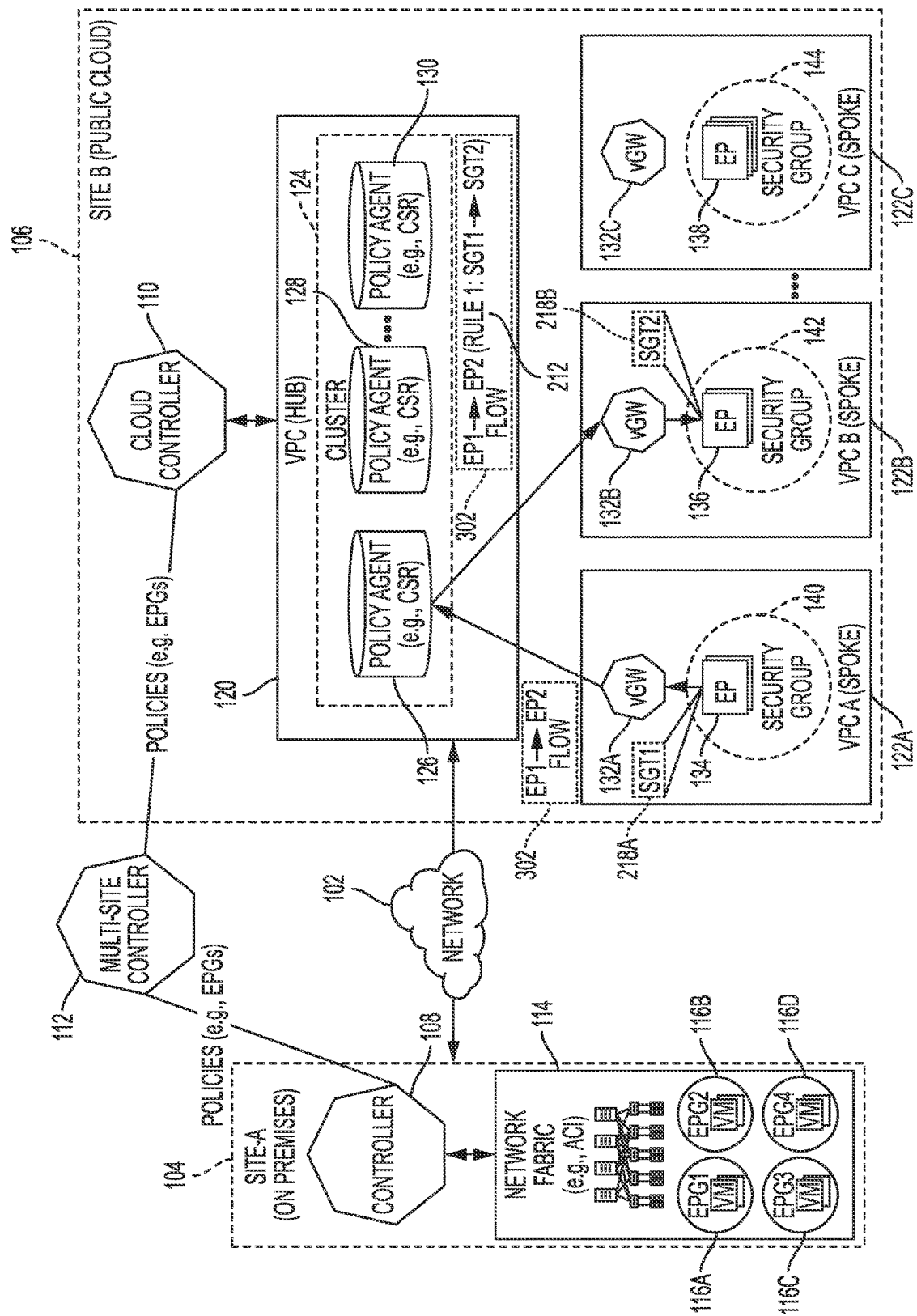
FIG. 3 illustrates a rule being applied to a flow between endpoints on different virtual private clouds configured in the example architecture shown in FIG. 1.

FIG. 3 illustrates rule 212 being applied to a flow 302 between endpoint 134 on VPC 122A and endpoint 136 on VPC 122B. In this example, endpoint 134 is mapped to SGT 218A (e.g., via the IP associated with endpoint 134) and endpoint 136 is mapped to SGT 218B (e.g., via the IP associated with endpoint 136). Based on the mapping of endpoint 134 to SGT 218A and endpoint 136 to SGT 218B, rule 212 can enforce the contract defined in policy 206 between EPG 116A and EPG 116B for the traffic flow 302 on the public cloud 106.

In this example, rule 212 is implemented in the policy agent 126 in the cluster 124. The virtual gateway 132A first sends the flow 302 from endpoint 134 to the policy agent 126. The policy agent 126 receives the flow 302 and the policy agent 126 associates the flow 302 with rule 212 based on SGT 218A and/or SGT 218B. For example, in some cases, a policy agent 126 can apply a rule based on the destination SGT. In other cases, the policy agent 126 can apply a rule based on the source SGT or both the source SGT and the destination SGT.

Once the policy agent 126 associates the flow 302 with the rule 212, it can apply the rule to the flow 302 and send the flow 302 to the virtual gateway 132B on the VPC 122B for final delivery to endpoint 136. For example, assume that rule 212 is an allow rule which defines that traffic from SGT 218A to SGT 218B should be permitted. The policy agent 126 can thus allow the flow 302 to be delivered to endpoint 136 based on the rule 212 permitting traffic from SGT 218A to SGT 218B.

Figure 4:
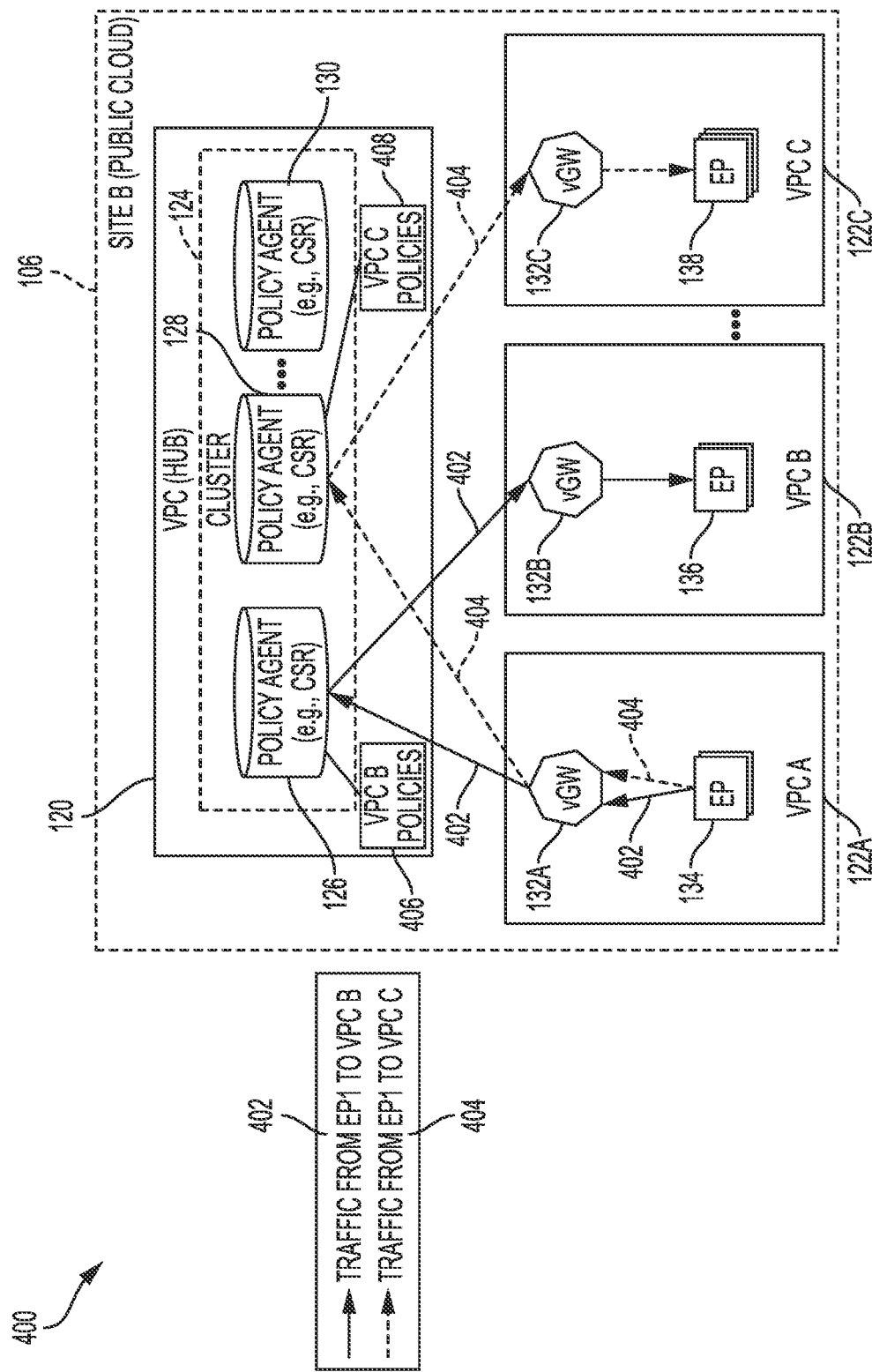
FIG. 4 illustrates an example distribution of policies in a cluster of routers configured in the example architecture shown in FIG. 1.

FIG. 4 illustrates an example distribution 400 of policies in the cluster 124. In this example, policies are distributed to specific policy agents (e.g., 126, 128, 130) in the cluster 124 based on the destination VPC associated with the policies. However, in other examples, distribution of policies can be performed based on other schemes. For example, policies can be distributed based on the source VPC, the source and destination VPCs, the source and/or destination VRFs, subnets, bandwidth, etc.

Based on the example scheme for distribution 400, the policies 406 associated with traffic having VPC 122B as its destination are implemented at the policy agent 126. On the other hand, the policies 408 associated with traffic having VPC 122C as its destination are implemented at the policy agent 128. Accordingly, only a particular policy agent—or subset of policy agents—in the cluster 124 may implement the policies for a given traffic. This results in increased scalability as each set of policies do not have to be installed or implemented on all policy agents in the cluster 124.

With this design, the combination of policy agents (e.g., 126, 128, 130) in cluster 124 can become a virtual entity that has n policy agents (e.g., 126, 128, 130) in its cluster (e.g., 124) capable of applying policies across all endpoints (e.g., EPs 134, 136, 138) in the public cloud 106. The cluster 124 can grow and shrink in size as and when necessary by adding or removing policy agents (e.g., routers).

However, if only a subset of policy agents in the cluster 124 have the necessary policies for a given traffic, traffic will need to be routed accordingly to pass through the appropriate policy agent. While all of the policy agents (e.g., 126, 128, 130) may have the routes to get to all possible destinations, each policy agent may only advertise a specific set of routes based on what policies are carried by the policy agent. This can be achieved by using route control using, for example, BGP (Border Gateway Protocol) route maps, as further described below with reference to FIG. 5.

Thus, when virtual gateway 132A on VPC 122A receives flow 402 from endpoint 134 on VPC 122A to endpoint 136 on VPC 122B, virtual gateway 132A will send the flow 402 to policy agent 126 on VPC 120, which contains the policies for traffic destined to VPC 122B. The policy agent 126 receives the flow 402 and applies to the flow 402 one or more policies from the policies 406 for traffic destined to VPC 122B. The policy agent 126 thus obtains the flow 402 and applies the necessary policies to flow 402, before sending the flow 402 to virtual gateway 132B on VPC 122B. In some cases, the policy agent 126 can identify which specific policies from the policies 406 correspond to flow 402 based on an SGT in flow 402 that is mapped to the IP of endpoint 136 on VPC 122B.

On the other hand, when virtual gateway 132A on VPC 122A receives flow 404 from endpoint 134 on VPC 122A to endpoint 138 on VPC 122C, virtual gateway 132A will send the flow 404 to policy agent 128 on VPC 120, which contains the policies for traffic destined to VPC 122C. The policy agent 128 receives the flow 404 and applies one or more policies from the policies 406 for traffic destined to VPC 122C. The policy agent 128 thus obtains the flow 404 and applies the necessary policies to flow 404, before sending the flow 404 to virtual gateway 132c on VPC 122C. In some cases, the policy agent 128 can identify the specific policies that correspond to flow 404 based on an SGT in flow 404 that is mapped to the IP of endpoint 138 on VPC 122C.

Figure 5:
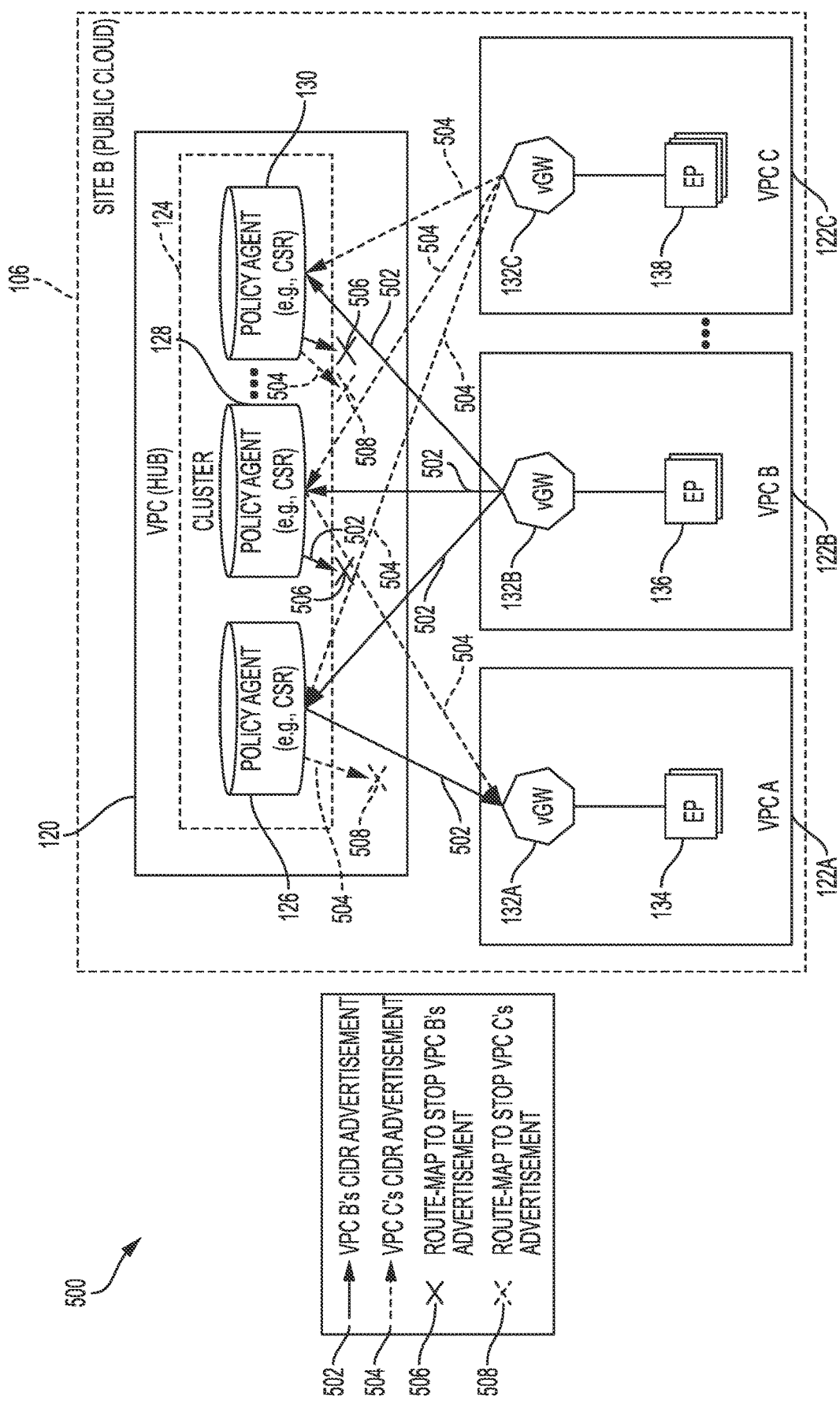
FIG. 5 illustrates an example distribution of routes in the example architecture shown in FIG. 1, for ensuring that traffic is processed by the appropriate policy agent containing the policies defined for that traffic.

FIG. 5 illustrates an example route distribution 500 by policy agents 126, 128, 130 in the cluster 124 for ensuring that traffic is processed by the appropriate policy agent in the cluster 124 containing the policies for that traffic. In this example, advertisement 502 represents advertisements (e.g., via BGP) of VPC 122B's CIDR (Classless Inter-Domain Routing), and advertisement 504 represents advertisements (e.g., via BGP) of VPC 122C's CIDR. Route map 506 represents a route map for stopping advertisement 502 of VPC 122B's CIDR, and route map 508 represents a route map for stopping advertisement 504 of VPC 122C's CIDR. Route maps 506, 508 can essentially tell BGP to avoid advertising certain routes (e.g., VPC 122B's CIDR, VPC 122C's CIDR). This way, the route maps 506, 508 can prevent certain policy agents (e.g., 126, 128, 130) from sending certain BGP advertisements to the virtual gateways 132A-C to ensure those virtual gateways 132A-C do not send traffic to certain destinations to certain policy agents that do not have policies for those destinations. Accordingly, with the route maps 506, 508, the policy agents 126, 128, 130 can ensure that they only receive traffic from the virtual gateways 132A-C for which they have policies for.

In FIG. 5, the policy agent 126 carries policies for traffic destined to VPC 122B but does not carry policies for traffic destined to VPC 122C. Accordingly, policy agent 126 can send advertisement 502 to virtual gateway 132A on VPC 122A, advertising VPC 122B's CIDR to virtual gateway 132A so traffic sent from virtual gateway 132A to VPC 122B goes through policy agent 126 instead of policy agent 128 or policy agent 130. In addition, policy agent 126 implements route map 508 to stop policy agent 126 from advertising VPC 122C's CIDR. Advertisement 502 and route map 508 will thus ensure that policy agent 126 advertises VPC 122B's CIDR but does not advertise VPC 122C's CIDR in order to allow policy agent 126 to receive and process traffic to VPC 122B while ensuring that traffic to VPC 122C is not sent to policy agent 126.

On the other hand, the policy agent 128 carries policies for traffic destined to VPC 122C but does not carry policies for traffic destined to VPC 122B. Accordingly, policy agent 128 can send advertisement 504 to virtual gateway 132A on VPC 122A, advertising VPC 122C's CIDR to virtual gateway 132A so traffic sent from virtual gateway 132A to VPC 122C goes through policy agent 128 instead of policy agent 126 or policy agent 130. In addition, policy agent 128 implements route map 506 to stop policy agent 128 from advertising VPC 122B's CIDR. Advertisement 504 and route map 506 will thus ensure that policy agent 128 advertises VPC 122C's CIDR but does not advertise VPC 122B's CIDR in order to allow policy agent 128 to receive and process traffic to VPC 122C while ensuring that traffic to VPC 122B is not sent to policy agent 128.

The policy agent 130 does not carry policies for traffic destined to VPC 122B or VPC 122C. Accordingly, policy agent 130 does not send advertisements 502 or 504 to any of the virtual gateways 132A-C. To this end, policy agent 130 implements both route map 506 and route map 508 to prevent policy agent 130 from sending advertisements 502 or 504 for VPC 122B's CIDR and VPC 122C's CIDR.

As illustrated above, using advertisements 502 and 504 and route maps 506 and 508 allows policies to be distributed across the policy agents in the cluster 124 while ensuring that traffic from the VPCs 122A-C is routed through the policy agent or subset of policy agents in the cluster 124 that carry the policies for that traffic.

Once the routes are pruned as described above, it is guaranteed that the traffic will hit the designated policy agent or subset of policy agents that serves the destination VPC of that traffic. Therefore, the policies that are required for a pair of entities, such as two VPCs (or) two EPGs, can be programmed in two policy agents, each serving one of the destination VPCs or EPGs.

Note that traffic from one VPC can hit any of the policy agents (e.g., 126, 128, 130) depending on the destination VPC. In order to allow source routing checks, all the policy agents can learn the routes, although only one (or a subset) policy agent will distribute a given route to other VPCs. Source routing checks are useful for preventing rogue endpoints within a VPC from talking across. This provides the flexibility of applying certain policies only on the egress interface of the policy agent. In some scenarios, applying policies only on the egress interface helps increase scale. For example, to enable VPC 122A and VPC 122B to talk to VPC (122C) on port 443, 2 rules are necessary if applied on the ingress tunnel interfaces, while only one rule is necessary if applied on the egress interface. Moreover, without source route checks, a VPC subnet S1, which in this example is a shared subnet, can be allowed to talk across VPCs, while subnet S2, which in this example is strictly private, cannot be allowed to talk across to other VPCs.

As illustrated herein, these approaches allow policies to be scaled elastically on the policy agents in the cluster 124, thereby bypassing native cloud resource limitations such as AWS' 250-rule limit. Moreover, in addition to the foregoing, for greater security, basic security policies can also be implemented at the endpoints 134, 136, 138 on the public cloud 106. This can provide a whitelist policy model for endpoint communications within a VPC (e.g., VPC 122A, VPC 122B, VPC 122C) where an external policy agent may not be used, in order to prevent rogue traffic coming from other endpoints within the VPC, from the Internet or from other VPCs. A security model in the cloud of providing security policies at the host instance is the most granular security approach in terms of endpoint protection and should not be compromised. The following proposed scheme can achieve this with minimal addition to the number of rules at the endpoint, while providing the scale through the policy agents (e.g., routers 126, 128, 130).

The security rules at the endpoints 134, 136, 138 can handle security group (e.g., 140, 142, 144) rules for traffic within the VPC's CIDR (i.e., traffic that does not hit the hub VPC, VPC 120), and a minimum set of IP rules for traffic coming from outside the VPC from the policy agent. These rules can be based on some unique route-aggregation schemes. With the whitelist model, without these rules, traffic from outside the VPC will be dropped. At the same time, more granular policies are not necessary, as these are applied in the policy agent that is in the path of the traffic towards the endpoint.

Aggregated (supernet) rules for all the endpoints and subnets should not fall within the VPC's CIDR address range. This is because specific rules should still be retained for intra-VPC traffic.

Figure 6:
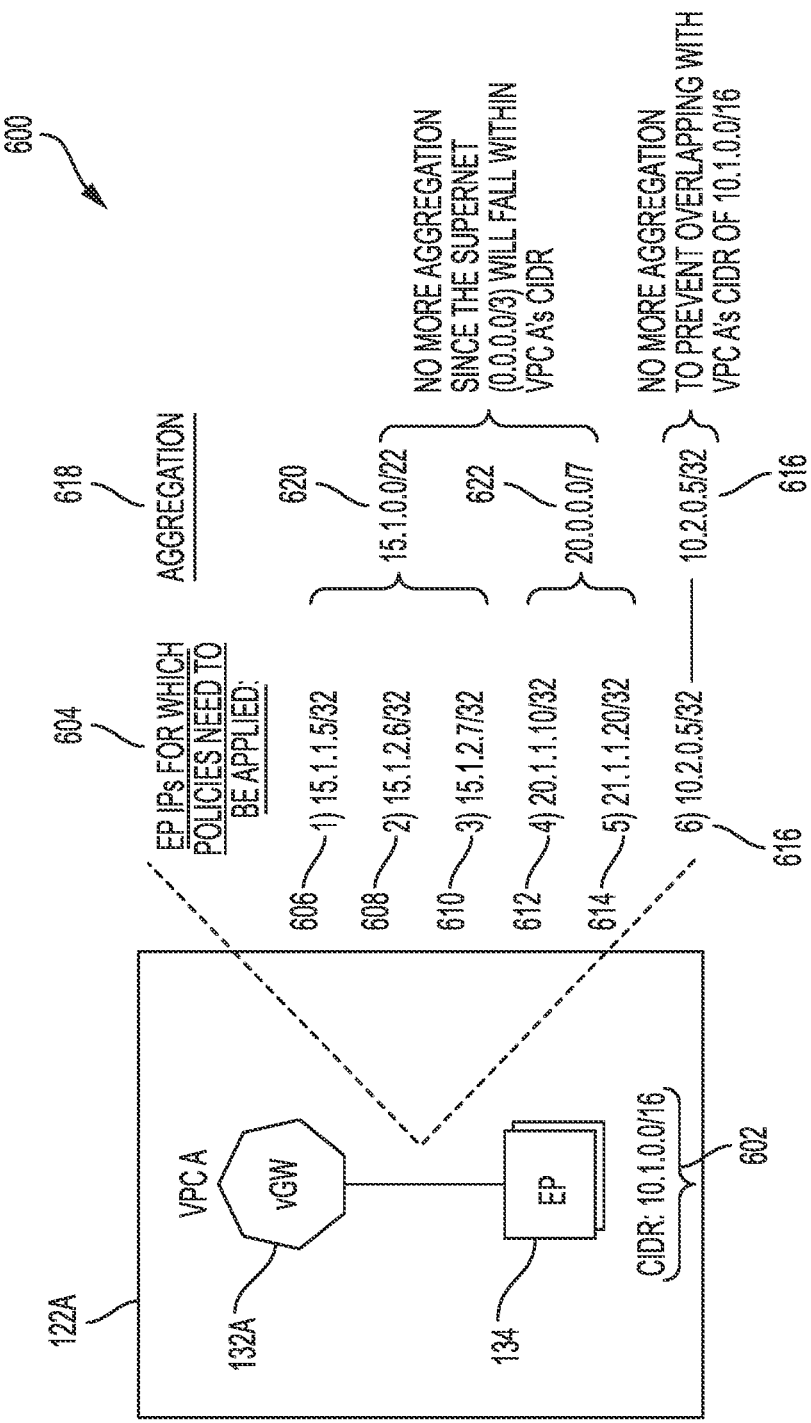
FIG. 6 illustrates an example scheme for aggregating routes to scale security rules implemented at endpoints in the example architecture shown in FIG. 1.

FIG. 6 illustrates an example scheme 600 for aggregating routes to scale security rules implemented at the endpoints. In this example, the CIDR 602 of VPC 122A is 10.1.0.0/16.

A list 604 of endpoint IPs includes the IPs (e.g., 606, 608, 610, 612, 614, 616) of endpoints (e.g., 134) for which policies should be applied. The list 604 includes IP 15.1.1.5/32 (606), IP 15.1.2.6/32 (608), IP 15.1.2.7/32 (610), IP 20.1.1.10/32 (612), IP 20.1.1.20/32 (614), and IP 10.2.0.5/32 (616).

The IPs (e.g., 606, 608, 610, 612, 614, 616) in the list 604 can be aggregated according to aggregation list 618. Aggregation list 618 includes aggregated prefix 620 and aggregated prefix 622. Aggregated prefix 620 aggregates IPs 15.1.1.5/32 (606), 15.1.2.6/32 (608), and 15.1.2.7/32 (610) into prefix 15.1.0.0/22. Aggregated prefix 622 aggregates IPs 20.1.1.10/32 (612) and 20.1.1.20/32 (614) into prefix 20.0.0.0/7. IP 10.2.0.5/32 (616) is not aggregated to prevent overlapping with CIDR 602 (10.1.0.0/16) of VPC 122A.

Aggregated prefixes 620 and 622 are not further aggregated since the supernet 0.0.0.0/3 would fall within CIDR 602 (10.1.0.0/16) of VPC 122A.

As shown above, 6 different /32 rules (i.e., rules associated with IPs 606, 608, 610, 612, 614, 616) can be successfully compressed into 3 prefix-based security group rules (i.e., security rules associated with aggregated prefix 620, aggregated prefix 622, and IP 616), thereby scaling policies within the public cloud 106. Assuming an endpoint in VPC 122A (e.g., EP 134) has 5 ports opened (e.g., SSH, RPC, and 3 application ports), without this scheme, 18 rules (i.e., 6 prefixes×3 ports) would be needed for the above example. By contrast, with the proposed scheme, only 3 rules (i.e., 3 prefixes×1 allow all rule) are needed, and the fine-grained rules for allowing only certain prefixes and ports can be achieved in the policy agent(s).

Figure 7:
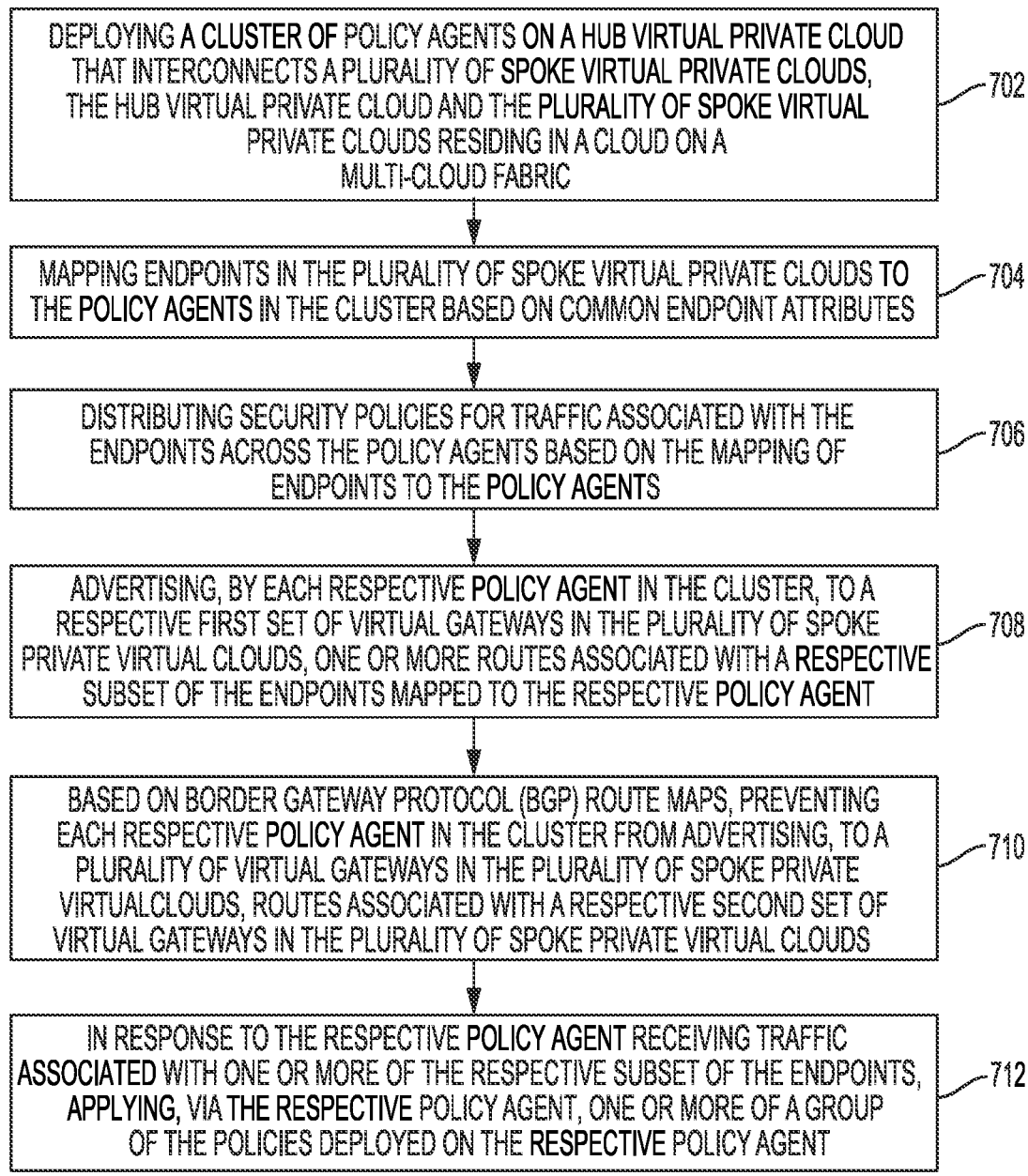
FIG. 7 illustrates an example method for elastic policy scaling and integration in multi-cloud fabrics.

Having described example systems and concepts, the disclosure now turns to the method illustrated in FIG. 7. The steps outlined herein are examples and can be implemented in any combination thereof, including combinations that exclude, add, or modify certain steps.

At step 702, the method can involve deploying a cluster (e.g., 124) of policy agents (e.g., 126, 128, 130) on a hub virtual private cloud (e.g., 120) that interconnects a plurality of spoke virtual private clouds (e.g., 122A, 122B, 122C). The hub virtual private cloud and the plurality of spoke virtual private clouds can be hosted on a cloud (e.g., 106) associated with a multi-cloud fabric (e.g., 100).

At step 704, the method can involve mapping endpoints (e.g., 134, 136, 138) in the plurality of spoke virtual private clouds to the policy agents (e.g., 126, 128, 130) in the cluster (e.g., 124) based on one or more common attributes. The one or more common attributes can include common virtual private clouds (e.g., VPC 122A, VPC 122B, VPC 122C) associated with the endpoints, common subnets associated with the endpoints, common endpoint groups (EPGs) associated with the endpoints, common virtual routing and forwarding (VRF) instances associated with the endpoints, etc. For example, the one or more common attributes can include common virtual private clouds associated endpoints. In this example, endpoints residing on a same virtual private cloud can be mapped to the same policy agent. To illustrate, endpoints 134 residing in VPC 122A can be mapped to policy agent 126 based on the endpoints 134 having a common VPC. Endpoints 136 residing in VPC 122B and thus having a common VPC can be mapped to policy agent 128, and endpoints 138 residing in VPC 122C and thus having a common VPC can be mapped to policy agent 130.

At step 706, the method can involve distributing security policies (e.g., 204) associated with the endpoints across the policy agents (e.g., 126, 128, 130) based on the mapping of endpoints to the policy agents (e.g., 126, 128, 130). In some cases, the security policies can also be distributed based on other factors, such as policy scale and/or bandwidth requirements on endpoints, bandwidth availability on policy agents, etc. Moreover, the security policies can include groups of security policies defined for traffic associated with respective subsets of the endpoints. For example, the security policies can include a group of security policies defined for a set of endpoints on VPC 122A, a group of security policies defined for a set of endpoints on VPC 122B, and a group of security policies defined for a set of endpoints on VPC 122C. Each group of security policies can be deployed on a policy agent that is mapped to a respective subset of the endpoints associated with the group of security policies. For example, the group of security policies defined for the set of endpoints on VPC 122A can be deployed on a policy agent mapped to that set of endpoints, the group of security policies defined for the set of endpoints on VPC 122B can be deployed on a policy agent mapped to that set of endpoints, and the group of security policies defined for the set of endpoints on VPC 122C can be deployed on a policy agent mapped to that set of endpoints.

The distribution of security policies across different policy agents in the cluster (e.g., 124) can increase the scale of security policies on the overall cluster. For example, instead of mirroring the same security policies across all policy agents in the cluster, distributing different security policies to at least some of the policy agents allows the cluster to support a greater number of security policies in total. The more security policies are distributed to different policy agents, the higher number of total security policies that may be supported by the cluster overall.

At step 708, the method can involve advertising, by each respective policy agent in the cluster, to a respective first set of virtual gateways (e.g., 132A, 132B, or 132C) in the plurality of spoke private virtual clouds (e.g., 122A, 122B, 122C), routes associated with the respective subset of the endpoints mapped to the respective policy agent. This can ensure that the first set of virtual gateways will forward traffic associated with the respective subset of the endpoints to the respective policy agent having the security policies for the respective subset of the endpoints.

At step 710, based on border gateway protocol (BGP) route maps, the method can involve preventing each respective policy agent in the cluster from advertising routes associated with a respective second set of virtual gateways in the plurality of spoke private virtual clouds. The respective second set of virtual gateways can be virtual gateways that route traffic for those endpoints that the respective policy agent does not have security policies for. This can ensure that the second set of virtual gateways do not forward traffic associated with endpoints that the respective policy agent does not have security policies for.

To illustrate, if the security policies defined for endpoints 136 on VPC 122B are deployed at the policy agent 126, at step 708 the policy agent 126 can advertise to virtual gateway 132A routes associated with endpoints 136. On the other hand, if the security policies defined for endpoints 138 on VPC 122C are not deployed at the policy agent 126, at step 710 the policy agent 126 can use route maps to avoid advertising to virtual gateway 132A routes associated with endpoints 138. This way, if virtual gateway 132A receives traffic destined to endpoints 136, it will forward the traffic to policy agent 126 which can then apply the security policies defined for endpoints 136, and if virtual gateway 132A receives traffic destined to endpoints 138, it will not forward the traffic to policy agent 126 which does not have the security policies defined for endpoints 138.

At step 712, the method can involve, in response to the respective policy agent receiving traffic associated with one or more of the endpoints, applying, via the respective policy agent, one or more of the group of security policies deployed on the respective policy agent. Thus, when the respective policy agent receives traffic, it can apply any security policies it has for that specific traffic. For example, if policy agent 126 receives traffic for endpoint 136, the policy agent 126 can apply any security policies it has for endpoint 136.

In some cases, the method can involve defining respective security group tags (SGTs) (e.g., 218A-D) associated with the groups of security policies, and associating the endpoints (e.g., 134, 136, 138) with the respective SGTs based on respective endpoint attributes. The respective endpoint attributes can include, for example, a respective type of traffic associated with the endpoints (e.g., web traffic, application traffic, etc.), predetermined security requirements associated with the endpoints, etc. Moreover, in some examples, associating the endpoints with the respective SGTs can include mapping respective IP addresses of the endpoints to the respective SGTs to yield IP-to-SGT mappings. The IP-to-SGT mappings can be used to apply security policies to traffic associated with the IP addresses of the endpoints. For example, each SGT can be associated with a set of security policies (e.g., 212, 214, 216)) defined for endpoints mapped to the SGT. When a policy agent then receives traffic associated with an IP mapped to an SGT, the policy agent can apply to that traffic any security policies associated with that SGT.

In some implementations, the respective SGTs can correspond to respective endpoint EPGs (e.g., 116A-D) on a private cloud (e.g., 104) associated with the multi-cloud fabric, and the groups of security policies can correspond to EPG policies (e.g., 206, 208, 210) on the private cloud. The respective SGTs can thus be used to translate EPG policies from the private cloud and apply the translated EPG policies to the endpoints (134, 136, 138) in the VPCs (122A-C) on the public cloud (e.g., 106). Thus, if the public cloud (e.g., 106) does not support the number and/or type of policies (e.g., EPG policies 206, 208, 210) on the private cloud (e.g., 104), the SGTs can be used to mirror those policies on the public cloud (e.g., 106) and increase the scale of policies applied by the policy agents (e.g., 126, 128, 130) on the public cloud beyond the number of policies supported by the public cloud. This way, the VPCs (122A, 122B, 122C) on the public cloud are not constrained by the policy model or restrictions imposed by the cloud provider associated with the public cloud.

In some cases, the policy agents (e.g., 126, 128, 130) can apply security policies based on the destination endpoints of the traffic. For example, the policy agents can be configured to apply security policies only on their egress interfaces. This configuration can help increase the scale of overall policies supported by the cluster (e.g., 124). To illustrate, assume a network operator wants to allow VPC-1 to VPC-10 to communicate with VPC-11 only on port 443. In this example, the network operator can apply 10 rules at a router's ingress interface to achieve this result. On the other hand, the network operator can achieve the same result by applying a single rule at the egress interface.

In some implementations, the method can also apply some security policies at the endpoints (e.g., 134, 136, 138). This can be done to provide a whitelist policy model for endpoint communications within a same VPC, as such traffic may not traverse an external policy agent (e.g., 126, 128, 130). The security policies at the endpoints can thus prevent rogue traffic from other endpoints within the same VPC, from the Internet, or from other VPCs. The security policies can provide security group rules for traffic within the VPC's CIDR (e.g., traffic that does not traverse the hub VPC 120) and IP rules for traffic from outside the hub VPC (e.g., 120). In a whitelist model, without such security policies at the endpoints, traffic from outside of an endpoint's VPC may otherwise be dropped. The security policies at the endpoints do not necessarily have to be granular, as granular security policies can be applied by the policy agents (e.g., 126, 128, 130) in the path of the traffic, as previously described.

For scalability, the security policies at the endpoints can be aggregated based on an aggregation scheme, such as a prefix-based aggregation scheme. The aggregated rules (e.g., supernet rules) for all the endpoints and subnets can be configured to prevent such aggregated rules from falling within the VPC's CIDR address range so rules for intra-VPC traffic can be retained. The aggregation of rules can allow the different rules to be compressed into a smaller number of rules applied at an aggregated level, such as a prefix level, thus improving the scalability of such rules.

To illustrate, in some examples, multiple external endpoint prefixes can be summarized into an aggregated prefix and a rule(s) for the aggregated prefix can be applied at one or more endpoints in a VPC. The aggregated prefix can be summarized as much as possible without overlapping with any subnets in the VPC.

For example, if a VPC's subnet is 10.0.0.0/8 and the external prefixes are 11.1.1.0/24, 11.1.2.0/24, 11.2.1.0/24, and 11.2.2.0/24, the external prefixes can be summarized as 11.1.0.0/16 and 11.2.0.0/16. However, in this example, the summarized prefixes 11.1.0.0/16 and 11.2.0.0/16 can be further summarized into a single prefix; namely, 11.0.0.0/8, which does not overlap with the VPC subnet 10.0.0.0/8. This results in much fewer entries which consequently increases scalability.

A single rule can be established for each summarized (or aggregated) prefix to allow traffic associated with the summarized prefix. Rules for each application port are not necessary at the endpoints, as this is already handled at the policy agents. Accordingly, the rule on the endpoint can be configured to allow all traffic from the summarized prefix. This approach can provide significant savings on security rules at each endpoint, which in the example of the AWS cloud solution, is limited to 250 security rules.

The disclosure now turns to FIGS. 8 and 9, which illustrate example network devices and computing devices, such as switches, routers, client devices, and so forth.

FIG. 8 illustrates an example network device 800 suitable for implementing policy agents and performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

FIG. 9 illustrates a computing system architecture 900 wherein the components of the system are in electrical communication with each other using a connection 905, such as a bus. Exemplary system 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer implement method, comprising:
deploying a cluster of policy agents on a virtual private cloud that interconnects a plurality of virtual private clouds, the virtual private cloud and the plurality of virtual private clouds residing in a cloud associated with a multi-cloud fabric;
mapping endpoints in the plurality of virtual private clouds to the policy agents in the cluster based on one or more common attributes;
distributing security policies for traffic associated with the endpoints across the policy agents in the cluster based on the mapping of endpoints to the policy agents in the cluster, wherein the security policies comprise groups of security policies defined for traffic associated with respective subsets of the endpoints, and wherein each group of security policies is deployed on a respective policy agent that is mapped to a respective subset of the endpoints;
advertising, by each respective policy agent in the cluster to a respective first set of virtual gateways in the plurality of private virtual clouds, one or more routes associated with the respective subset of the endpoints mapped to the respective policy agent;
based on border gateway protocol (BGP) route maps, preventing each respective policy agent in the cluster from advertising, to a plurality of virtual gateways in the plurality of private virtual clouds, routes associated with a respective second set of virtual gateways in the plurality of private virtual clouds;

in response to the respective policy agent receiving traffic associated with one or more of the endpoints, applying, via the respective policy agent, one or more of the group of security policies deployed on the respective policy agent;

identifying a plurality of external prefixes associated with a set of endpoints residing outside of a particular spoke virtual private cloud from a plurality of spoke virtual private clouds;

aggregating the plurality of external prefixes into a single external prefix that falls outside of a scope of a respective prefix associated with the particular spoke virtual private cloud; and configuring one or more endpoints in the particular spoke virtual private cloud to apply a permit rule for traffic matching the single external prefix.

2. The method of claim 1, further comprising:
defining respective security group tags (SGTs) associated with the groups of security policies.

3. The method of claim 2, further comprising:
associating the endpoints with the respective SGTs based on respective endpoint attributes.

4. The method of claim 3, wherein the applying the one or more of the group of security policies to the traffic associated with the one or more of the endpoints is based on a respective SGT associated with the one or more of the endpoints.

5. The method of claim 3, wherein the one or more of the group of security policies include a set of security policies defined for the respective SGT associated with the one or more of the endpoints.

6. The method of claim 3, wherein the associating the endpoints with the respective SGTs comprises mapping respective IP addresses of the endpoints to the respective SGTs to yield IP-to-SGT mappings.

7. The method of claim 1, wherein the policy agents in the cluster are configured to apply the plurality of security policies at respective egress interfaces prior to forwarding traffic to respective destination endpoints associated with the traffic.

8. At least one non-transitory computer-readable storage medium having stored therein instructions which, when executed by one or more processors, cause a system to perform operations comprising:

deploy a cluster of policy agents on a virtual private cloud that interconnects a plurality of virtual private clouds, the virtual private cloud and the plurality of virtual private clouds residing in a cloud associated with a multi-cloud fabric;

map endpoints in the plurality of virtual private clouds to the policy agents in the cluster based on one or more common attributes;

distribute security policies for traffic associated with the endpoints across the policy agents in the cluster based on the mapping of endpoints to the policy agents in the cluster, wherein the security policies comprise groups of security policies defined for traffic associated with respective subsets of the endpoints, and wherein each group of security policies is deployed on a respective policy agent that is mapped to a respective subset of the endpoints;

advertise, by each respective policy agent in the cluster to a respective first set of virtual gateways in the plurality of private virtual clouds, one or more routes associated with the respective subset of the endpoints mapped to the respective policy agent;

based on border gateway protocol (BGP) route maps, prevent each respective policy agent in the cluster from advertising, to a plurality of virtual gateways in the plurality of private virtual clouds, routes associated with a respective second set of virtual gateways in the plurality of private virtual clouds;

in response to the respective policy agent receiving traffic associated with one or more of the endpoints, apply, via the respective policy agent, one or more of the group of security policies deployed on the respective policy agent;

identify a plurality of external prefixes associated with a set of endpoints residing outside of a particular spoke virtual private cloud from a plurality of spoke virtual private clouds;

aggregate the plurality of external prefixes into a single external prefix that falls outside of a scope of a respective prefix associated with the particular spoke virtual private cloud; and configure one or more endpoints in the particular spoke virtual private cloud to apply a permit rule for traffic matching the single external prefix.

9. The at least one non-transitory computer readable storage medium of claim 8, the operations further comprising:
define respective security group tags (SGTs) associated with the groups of security policies.

10. The at least one non-transitory computer readable storage medium of claim 9, the operations further comprising:
associate the endpoints with the respective SGTs based on respective endpoint attributes.

11. The at least one non-transitory computer readable storage medium of claim 10, wherein the apply the one or more of the group of security policies to the traffic associated with the one or more of the endpoints is based on a respective SGT associated with the one or more of the endpoints.

12. The at least one non-transitory computer readable storage medium of claim 10, wherein the one or more of the group of security policies include a set of security policies defined for the respective SGT associated with the one or more of the endpoints.

13. The at least one non-transitory computer readable storage medium of claim 10, wherein the associate the endpoints with the respective SGTs comprises map respective IP addresses of the endpoints to the respective SGTs to yield IP-to-SGT mappings.

14. The at least one non-transitory computer readable storage medium of claim 8, wherein the policy agents in the cluster are configured to apply the plurality of security policies at respective egress interfaces prior to forwarding traffic to respective destination endpoints associated with the traffic.

15. A system comprising:
one or more processors; and
at least one computer-readable storage medium having stored therein instructions which, when executed by the one or more processors, cause the system to:
deploy a cluster of policy agents on a virtual private cloud that interconnects a plurality of virtual private clouds, the virtual private cloud and the plurality of virtual private clouds residing in a cloud associated with a multi-cloud fabric;

map endpoints in the plurality of virtual private clouds to the policy agents in the cluster based on one or more common attributes;

distribute security policies for traffic associated with the endpoints across the policy agents in the cluster based on the mapping of endpoints to the policy agents in the cluster, wherein the security policies comprise groups of security policies defined for traffic associated with respective subsets of the endpoints, and wherein each group of security policies is deployed on a respective policy agent that is mapped to a respective subset of the endpoints;

advertise, by each respective policy agent in the cluster to a respective first set of virtual gateways in the plurality of private virtual clouds, one or more routes associated with the respective subset of the endpoints mapped to the respective policy agent;

based on border gateway protocol (BGP) route maps, prevent each respective policy agent in the cluster from advertising, to a plurality of virtual gateways in the plurality of private virtual clouds, routes associated with a respective second set of virtual gateways in the plurality of private virtual clouds;

in response to the respective policy agent receiving traffic associated with one or more of the endpoints, apply, via the respective policy agent, one or more of the group of security policies deployed on the respective policy agent;

identify a plurality of external prefixes associated with a set of endpoints residing outside of a particular spoke virtual private cloud from a plurality of spoke virtual private clouds;

aggregate the plurality of external prefixes into a single external prefix that falls outside of a scope of a respective prefix associated with the particular spoke virtual private cloud; and configure one or more endpoints in the particular spoke virtual private cloud to apply a permit rule for traffic matching the single external prefix.

16. The system of claim 15, the operations further comprising:

define respective security group tags (SGTs) associated with the groups of security policies.

17. The system of claim 16, the operations further comprising:

associate the endpoints with the respective SGTs based on respective endpoint attributes.

18. The system of claim 17, wherein the apply the one or more of the group of security policies to the traffic associated with the one or more of the endpoints is based on a respective SGT associated with the one or more of the endpoints.

19. The system of claim 18, wherein the one or more of the group of security policies include a set of security policies defined for the respective SGT associated with the one or more of the endpoints.

20. The system of claim 18, wherein the associate the endpoints with the respective SGTs comprises map respective IP addresses of the endpoints to the respective SGTs to yield IP-to-SGT mappings.

\* \* \* \* \*